United States Patent [19]

Adyha et al.

[11] Patent Number: 5,322,883

[45] Date of Patent: Jun. 21, 1994

[54] THERMOPLASTIC POLYESTER WITH REDUCED FLAMMABILITY

[75] Inventors: Atish Adyha; Thomas F. Corbin; Robert L. Lilly, all of Asheville, N.C.

[73] Assignee: BASF Corporation, Parsippany, N.J.

[21] Appl. No.: 950,568

[22] Filed: Sep. 24, 1992

[51] Int. Cl.$^5$ ............................................. C08G 63/692
[52] U.S. Cl. ..................................... 524/601; 524/136; 524/140; 524/145; 524/604; 524/605; 528/287
[58] Field of Search ............... 524/136, 140, 145, 601, 524/604, 605; 528/287

[56] References Cited

U.S. PATENT DOCUMENTS 4,298,709  11/1981  Ginter et al. ...................... 528/287
5,132,391   7/1992  White et al. ....................... 528/287

Primary Examiner—Paul R. Michl
Assistant Examiner—Edward Cain

[57] ABSTRACT

Disclosed is a thermoplastic polyester with reduced flammability obtained by:

(a) condensating an aromatic dicarboxylic acid and an alkylene glycol in a mole ratio of from 1:1.1–1.5 at a temperature of from 180° to 240° C. in the presence of a catalyst;

(b) adding a polyalkylene glycol phosphate ester;

(c) polycondensating at a temperature of from 265° to 280° C. under a pressure decreasing from 760 torr to less than 2 torr until an intrinsic viscosity of about 0.5 to about 0.7 is reached.

14 Claims, No Drawings

1

THERMOPLASTIC POLYESTER WITH REDUCED FLAMMABILITY

FIELD OF THE INVENTION

The present invention is directed to a thermoplastic polyester with reduced flammability and a method for its manufacture, more specifically it is directed to a polyester obtained by the addition of a polyalkylene glycol phosphate ester to the polycondensation reaction.

BACKGROUND OF THE INVENTION

The main approaches to reduce the flammability of thermoplastic polyesters are melt additives, topical finish treatments, and copolymerization with flame resistant monomers. Melt additives generally include halogenated organic compounds with high levels of bromine or chlorine. A second component when halogenated compounds are employed is antimony trioxide ($Sb_2O_3$). Other popular elements found in melt additives are phosphorus, molybdenum and nitrogen.

Phosphorus compounds are widely used to reduce the flammability of thermoplastic polymers. For example U.S. Pat. Nos. 3,987,008; 4,203,888; 4,517,355; and 4,940,772 disclose a broad variety of organic phosphor compounds in thermoplastic polyesters.

U.S. Pat. No. 3,987,008 discloses a polyphosphonate with arylene and haloarylene groups. U.S. Pat. No. 4,203,888 discloses an aryl diphosphate.

One disadvantage of these phosphorus compounds is that they are inert additives which build a separate phase in the thermoplastic polyesters with negative influence of their properties and a tendency to migrate to the surface.

U.S. Pat. No. 4,517,355 describes a linear polyester, which contains a phosphinic acid derivative bonded in the macromolecule.

U.S. Pat. No. 4,940,772 describes a process for producing a flame resistant polyester by copolymerizing a polyester with an unsaturated compound and reacting this copolyester with a specific phosphorus compound.

An object of the present invention was to provide a thermoplastic polyester with reduced flammability and simultaneous excellent physical properties.

Another object was to provide a process for the manufacture of a thermoplastic polyester with reduced flammability for the manufacture of molded articles by injection molding or extrusion.

Still another object was to provide a masterbatch of a thermoplastic polyester with reduced flammability.

SUMMARY OF THE INVENTION

The objects of the present invention could be achieved by a thermoplastic polyester obtained by:
(a) condensating an aromatic dicarboxylic acid and an alkylene glycol in a mole ration of from 1:1.1–1.5 at a temperature of from 180° to 240° C. in the presence of a catalyst;
(b) adding a polyalkylene glycol phosphate ester; and
(c) polycondensating at a temperature of from 265° to 300° C. under a pressure decreasing from 760 torr to less than 2 torr until an intrinsic viscosity of about 0.5 to about 0.7 is reached.

DETAILED DESCRIPTION OF THE INVENTION

The preparation of aromatic thermoplastic polyester is well known in the art and described for example in U.S. Pat. Nos. 4,517,355 and 4,981,945.

In step (a) an aromatic dicarboxylic acid and an alkylene glycol is condensated in a molar ratio of from about 1:1.1–1.5 at a temperature beginning from about 180° C. to a temperature of about 260.C for a time period of up to about 2 to 3 hours in the presence of a catalyst, such as metal oxides or organic or inorganic metal salts, like antimony trioxide, germanium dioxide, manganese acetate, cobalt acetate and zinc acetate.

The catalyst content is from about 50 to 400 ppm based on the respective metal.

Suitable aromatic dicarboxylic acids are for example, terephthalic acid, isophthalic acid, phthalic acid, 5-sulphoisophthalic acid, diphenyl-para, para-dicarboxylic acid, paraphenylenediacetic acid, 2, 5-, 2, 6- or 2, 7-naphthalene dicarboxylic acid and mixtures thereof.

Preferred is terephthalic acid.

Suitable alkylene glycols are ethylene glycol, 1, 3-propanediol, 1,4-butanediol and higher homologues. Preferred is ethylene glycol and 1,4-butanediol.

In a preferred embodiment of this invention this first step (a) is conducted using lower alkyl ester of the aromatic dicarboxylic acid like $C_1$- to $C_4$- alkyl instead of the aromatic dicarboxylic acid. Preferred are the dimethyl esters of the aromatic dicarboxylic acids, whereby the formed methanol is distilled off the condensation reaction during the reaction time of from about 2 to about 3 hours.

For modifications purposes aliphatic dicarboxylic acids or their lower alkyl diester may be used in the condensation step (a) like succinic acid, sebacic acid, adipic acid, azelaic acid and the like in effective amounts.

At this point of the reaction the polyalkylene glycol phosphate ester is added as step (b).

The polyalkylene glycol phosphate ester of the present invention have the general formula:

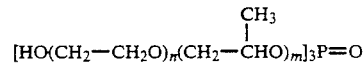

wherein
n is a number of from 1 to 10,
m is a number of from 0 to 3;
R is H or $C_1$-to-$C_{18}$-alkyl radical.

Suitable polyalkylene glycol phosphate esters are for example tris (triethylene glycol) phosphate, tris (diethylene glycol) phosphate, and mixed tris (alkylene glycol) phosphates.

Preferred is tris (triethylene glycol) phosphate (TEGPa).

The phosphate ester is added in an amount of from about 0.4 to about 5.0% by weight, preferably from about 0.8 to about 1.6% by weight, based on the total weight of polyethylene terepthalate.

The condensation conditions are changed in step (c) to a temperature of from about 265° up to about 300° C., preferably 265° to 280° C. with a pressure decreasing from 760 torr to less than 2 torr, preferably less than 1 torr, over a time period of from about 2 to 3 hours. During this time polycondensation occurs with the formation of a phosphate ester modified thermoplastic polyester having an intrinsic viscosity (IV) (1% solution in phenol/tetrachloro ethane (60:40) at 25° C.) of from about 0.5 to about 0.7, preferably 0.55 to about 0.65. The phosphate ester is involved in the polycondensation by the reaction with its hydroxy or ester groups and forms a copolycondensation product of the respective thermoplastic polyester.

The amount of phosphorus in the final product with reduced flammability is from about 50 to about 2000 ppm, preferably from about 500 to about 1000 ppm phosphorus.

In a preferred embodiment of the present invention first a masterbatch of phosphate ester containing thermoplastic polyester is produced containing from about 2000 to about 5000 ppm phosphorus. This master batch is mixed with an unmodified thermoplastic polyester before processing into molded articles by injection molding or extrusion.

Other additives might be added to the thermoplastic polyester of the present invention in effective amounts. Suitable additives are other flame retardants, fillers like talc, wollastonite, chalk, zinc sulfide, silicates, kaolin, fibers like glass fibers, UV-light stabilizers, antioxidants, pigments, dyes, antistatic agents, antimicrobial agents, nucleating agents and the like.

The thermoplastic polyester of the present invention may be used for the manufacture of molded articles by injection molding or of extruded articles like tubes or films by extrusion.

The articles have excellent physical properties and show reduced flammability as measured by its LOI (Limiting oxygen index, ASTM 2863) values and show no migration of the polyalkylene glycol phosphate.

EXAMPLES

Synthesis of a Master Batch of Modified Polyethylene Terephthalate

A mixture of dimethyl terephthalate (500 g), ethylene glycol (325 g), manganese acetate (0.1415 g) and antimony oxide (0.185 g) was heated while stirred under nitrogen. The temperature was raised from room temperature to 220° C. over a period of 2 hours. During the temperature rise, 160-170 ml of methanol is collected. After the methanol is removed the molten oligomer is cooled to 200° C. Tris (triethylene glycol) phosphate (25 g) (Emery 6696-A from Quantum Chemical Corporation, Emery Div.) was added to the molten oligomer and stirred for 5 min. The mixture was poured into the autoclave glass vessel and heated under decreasing pressure. The temperature was raised from 200° C. to 295° C. Excess ethylene glycol and some oligomers were removed, under vacuum, from the polymerizing mixture. The change in viscosity was visually observed and the polymer was extruded when the IV (intrinsic viscosity) of the polymer reached approximately 0.6. The analytical results show the phosphorous concentration was 0.48%.

EXAMPLE 1

Polyethylene terephthalate (Polyester chips Ultradur ® T-735, BASF AG, Ludwigshafen, Germany) was und for the LOI test in the form of chips.

EXAMPLE 2

21.2 lbs Polyethylene terephthalate (Polyester chips Ultradur ® T-735, BASF AG, Ludwigshafen, Germany) were tumble blended with the 4.2 lb master batch described above.

LOI - Test

The Oxygen Index of Example 1 (Control) and Example 2 were measured the ASTM method D 2863-87. The test sample was prepared by the following method:

The chips were placed in a wire mesh holder and placed in a chamber of the instrument built by U.S. Testing, Hoboken, N.J. (Model #1800). The chips were lighted by a burner with flame size 25 mm long. The burner was connected to an oxygen and nitrogen source. The phosphorus concentration and the LOI for the polymers are listed in the Table.

TABLE

|  | Phosphorus (ppm) | LOI |
|---|---|---|
| Example 1 (Control) | 0 | 29.00 |
| Example 2 | 611 | 31.73 |

We claim:
1. A thermoplastic polyester obtained by:
   (a) condensating an aromatic dicarboxylic acid or a lower alkyl ester thereof and an alkylene glycol in a mole ratio of from 1:1.1–1.5 at a temperature of from 180°0 to 240° C. in the presence of a catalyst;
   (b) adding a polyalkylene glycol phosphate ester of the general formula:

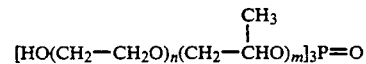

wherein
   n is a number of from 1 to 10
   m is a number of from 0 to 3;
   (c) polycondensating at a temperature of from 265° to 300° C. under a pressure decreasing from 760 torr to less than 2 torr until an intrinsic viscosity of about 0.5 to about 0.7 is reached.

2. The polyester according to claim wherein the aromatic dicarboxylic acid is selected from the group consisting of terephthalic acid, isophthalic acid, 5-sulfoisophthalic acid, diphenyl-para, para -dicarboxylic acid, para-phenylenediacetic acid, 2, 5-, 2,6- or 2,7-naphthalene dicarboxylic acid and mixtures thereof.

3. The polyester according to claim 1, wherein the aromatic dicarboxylic acid is terephthalic acid.

4. The polyester according to claim 1, wherein the lower alkylester of the aromatic dicarboxylic acid is a $C_1$ to $C_4$-alkylester.

5. The polyester according to claim 4, wherein the lower alkylester is a methylester.

6. The polyester according to claim 1, wherein the alkylene glycol is selected from the group consisting of ethylene glycol, 1,3 propane-diol, 1,4- butanediol and mixtures thereof.

7. The polyester according to claim 1, wherein the alkylene glycol is ethylene glycol.

8. The polyester according to claim 1, wherein said polyalkylene glycol phosphate ester is selected from the group consisting of tris (triethylene glycol) phosphate, tris (diethylene glycol) phosphate and mixed tris (alkylene glycol) phosphates.

9. The polyester according to claim 1, wherein said polyalkylene glycol phosphate ester is added in an amount of from about 0.1 to about 10% by weight, based on the polyethylene terephthalate.

10. The polyester according to claim 1, wherein said catalyst is selected from the group consisting of metal oxides, organic metal salts, and inorganic metal salts.

11. The polyester according to claim 10, wherein said catalyst is selected from the group consisting of antimon trioxide, germanium dioxide, manganese acetate, cobalt acetate, zinc acetate and mixtures thereof.

12. The polyester according to claim 1, wherein the catalyst content is from about 50 to about 500 ppm, based on the respective metal.

13. A process for producing a thermoplastic polyester comprising the steps of:
(a) condensating an aromatic dicarboxylic acid or a lower alkylester thereof and an alkylene glycol in a mole ratio of from 1:1.1–1.5 at a temperature of from 180° to 240° C. in the presence of a catalyst;
(b) adding a polyalkylene glycol phosphate ester of the general formula:

$$[HO(CH_2-CH_2O)_n(CH_2-\overset{\overset{\displaystyle CH_3}{|}}{C}HO)_m]_3P=O$$

wherein
n is a number of from 1 to 10,
m is a number of from 0 to 3;
(c) polycondensating at a temperature of from 265° to 300° C. under a pressure decreasing from 760 torr to less than 2 torr until an intrinsic viscosity of about 0.5 to about 0.7 is reached.

14. An article, formed from the thermoplastic polyester according to claim 1.

* * * * *

UNITED STATES PATENT AND TRADEMARK OFFICE
CERTIFICATE OF CORRECTION

PATENT NO.   :   5,322,883
DATED        :   June 21, 1994
INVENTOR(S)  :   Atish Adyha; Thomas F. Corbin; Robert L. Lilly It is certified that error appears in the above-identified patent and that said Letters Patent is hereby corrected as shown below:

At column 4, line 41, please insert --1-- after "claim".

Signed and Sealed this

Thirtieth Day of August, 1994

*Attest:*

BRUCE LEHMAN

*Attesting Officer*   *Commissioner of Patents and Trademarks*